(12) United States Patent
May et al.

(10) Patent No.: US 6,571,639 B1
(45) Date of Patent: Jun. 3, 2003

(54) FIBER OPTIC SYSTEM

(75) Inventors: Russell G. May, Blacksburg, VA (US); Thomas A. Wavering, Blacksburg, VA (US)

(73) Assignee: Luna Innovations, Inc., Blacksburg, VA (US)

( * ) Notice: Subject to any disclaimer, the term of this patent is extended or adjusted under 35 U.S.C. 154(b) by 0 days.

(21) Appl. No.: 09/259,972

(22) Filed: Mar. 1, 1999

(51) Int. Cl.[7] .................................................. G01L 1/24
(52) U.S. Cl. ...................................................... 73/800
(58) Field of Search .................... 73/800, 655, 862.624, 73/796, 588, 768, 596, 599; 330/4.3; 250/227.14

(56) References Cited

U.S. PATENT DOCUMENTS

| | | | |
|---|---|---|---|
| 4,525,626 A | 6/1985 | Kush et al. | |
| 4,862,384 A | 8/1989 | Bujard | |
| 5,023,845 A | 6/1991 | Crane et al. | |
| 5,211,054 A | 5/1993 | Muramatsu et al. | |
| 5,301,001 A * | 4/1994 | Murphy et al. | 356/35.5 |
| 5,367,583 A * | 11/1994 | Sirkis | 385/12 |
| 5,381,005 A * | 1/1995 | Chazelas et al. | 250/227.19 |
| 5,513,913 A * | 5/1996 | Ball et al. | 73/800 |
| 5,594,819 A * | 1/1997 | Narendran et al. | 385/12 |
| 5,632,841 A * | 5/1997 | Hellbaum et al. | 156/245 |
| 5,649,035 A | 7/1997 | Zimmerman et al. | |
| 5,682,237 A | 10/1997 | Belk | |
| 5,682,445 A * | 10/1997 | Smith | 385/7 |
| 5,781,646 A | 7/1998 | Face | |
| 5,812,251 A | 9/1998 | Manesh | |
| 5,814,729 A * | 9/1998 | Wu et al. | 73/7 |
| 6,293,635 B1 * | 9/2001 | Freudelsperger | 312/42 |

OTHER PUBLICATIONS

Russell G. May et al., "In–Situ Fiber Optic Sensor for Composite Cure Monitoring Through Characterization of Resin Viscoelasticity," *SPIE*, Dec. 1996, pp. 24–34, vol. 2948.

Russell G. May et al., "Multifunctional Fiber Optic Sensor for Manufacturing of Thermoset Matrix Composite Materials," *SPIE*, Mar. 1997, pp. 244–251, vol. 3044.

* cited by examiner

*Primary Examiner*—Max Noori
(74) *Attorney, Agent, or Firm*—Joy L. Bryant

(57) ABSTRACT

A fiber optic system and method of use is disclosed. The fiber optic system comprises a laminated, pre-stressed, piezoelectric actuator; and a fiber optic strain gage having an input/output fiber, wherein the fiber optic strain gage is attached to a surface of the laminated, pre-stressed, piezoelectric actuator. The fiber optic system is useful for performing dynamic mechanical analysis on a sample.

18 Claims, 4 Drawing Sheets

FIBER OPTIC SYSTEM

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DAAJ02-96-C0034 awarded by the U.S. Army.

FIELD OF THE INVENTION

The present invention relates to instrumentation used to conduct dynamic mechanical analysis on a sample during and after a cure cycle. In particular, it relates to a fiber optic system capable of performing dynamic mechanical analysis.

BACKGROUND OF THE INVENTION

It is often difficult to determine the extent of cure of thermosetting polymers during the manufacturing of polymer matrix composites. Typically, a composite is cured using a manufacturer-recommended time-temperature schedule instead of directly monitoring the resin properties as the sample cures. Once the schedule is complete, the resulting part is inspected and tested to insure that the mechanical properties are acceptable.

A number of approaches have been proposed to remove the guesswork from the cure cycle and to insure that the thermosetting polymer matrix composite is fully cured prior to use. Such approaches include measuring the refractive index of the resin; measuring the dielectric properties of the resin; or monitoring the acoustic attenuation of the material. More recently, investigators (Russell G. May et al., "*In-Situ Fiber Optic Sensor for Composite Cure Monitoring Through Characterization of Resin Viscoelasticity*," Proc. Of SPIE, Vol. 2948, pp 24–34, December 1996; and Russell G. May et al., "*Multifunctional Fiber Optic Sensor for Manufacturing of Thermoset Matrix Composite Materials*," Proc. Of SPIE, Vol. 3044, pp 244–251, March 1997) discovered that coupling a fiber optic strain sensor to an actuator, will yield a miniature dynamic mechanical analysis system. By immersing the sensor in a curing thermoset resin, a time-varying excitation is applied to the actuator which causes the sensor to vibrate harmonically. A comparison of the phase of the excitation to the phase of the resulting strain as detected by the strain sensor makes it possible to derive the loss tangent of the resin which is related to the degree of cure of the resin. When the resin is completely cured, the fiber optic sensor functions as a conventional strain sensor, permitting in-service strains in the composite part to be measured.

These particular sensors have various short-comings. The piezoelectric actuators typically used for constructing the sensor assembly are brittle or fracture easily during typical composite manufacturing processes, such as hot pressing. In addition, absolute measurements of the complex modulus of the resin depends on the distance separating the vibrating actuator from any adjacent unmoving boundaries. Since this distance cannot generally be fixed in composite manufacturing, the complex modulus cannot be measured in an absolute sense. Only relative changes in modulus can be determined. Lastly, the determination of the vibration amplitude by the use of fiber optic strain gages is sensitive to optical losses that may result in the optical fiber or the optical fiber connector.

An object of the present invention is to provide a fiber optic system that uses a robust piezoelectric actuator which is capable of withstanding the application of pressure.

Another object of the present invention is to establish fixed boundary conditions for the sensor assembly.

Another object of the present invention is to render the determination of the vibration amplitude insensitive to fiber optic losses.

SUMMARY OF THE INVENTION

These and other objects were achieved by the present invention which is for a fiber optic system which comprises a laminated, pre-stressed, piezoelectric actuator; and a fiber optic strain gage having an input/output fiber. The fiber optic strain gage is attached to a surface of the laminated, pre-stressed, piezoelectric actuator. In a further embodiment of the invention, the fiber optic system comprises a high voltage amplifier and frequency generator attached to fine gauge wires that are attached to an electrode pair on the laminated, pre-stressed, piezoelectric actuator. In addition, a signal processing unit is positioned in an operable relationship to the input/output optical fiber and the fine gage wires. In yet another embodiment, a micromachined silicon housing surrounds the actuator and the fiber optic strain gage.

The fiber optic system of the present invention is useful for performing dynamic mechanical analysis on a sample. In operation, the fiber optic system is provided and a sample is exposed to the system. A stress is applied to the sample through the actuator and a change in the strain amplitude signal of the sample is measured using the signal processing unit.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
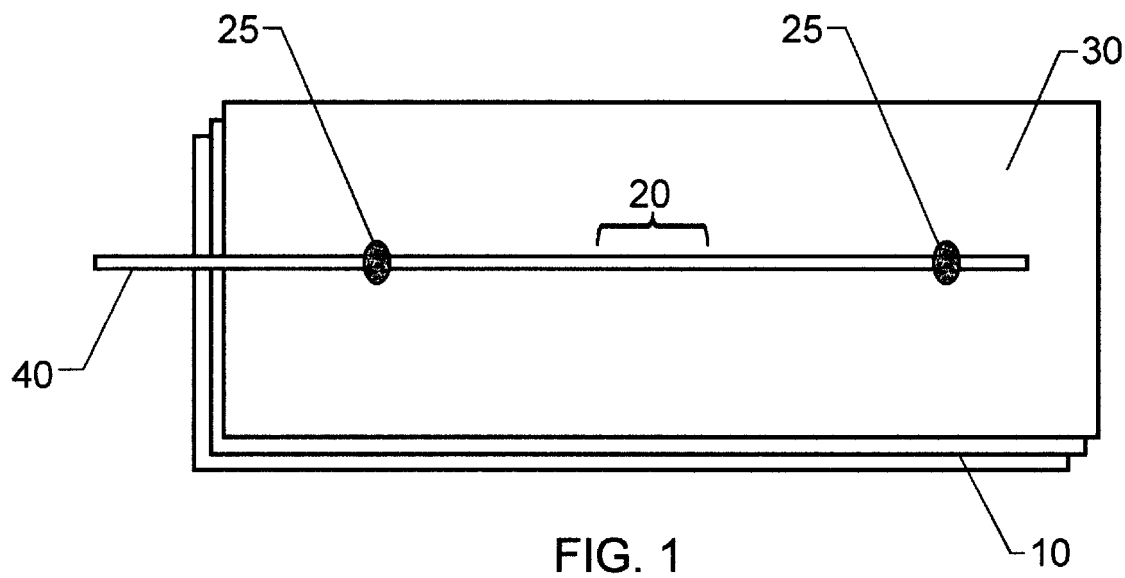
FIG. 1 is a perspective view of the fiber optic system of the present invention.

Referring now to the drawings where similar parts are numbered the same, FIG. 1 depicts the simplest embodiment of the fiber optic system. The system comprises a laminated, pre-stressed, piezoelectric actuator 10 and a fiber optic strain gage 20 attached to a surface 30 of the laminated, pre-stressed, piezoelectric actuator 10. The fiber optic strain gage may be attached to any surface of the actuator but preferably, it is attached to a convex side of the actuator. Typically, the fiber optic strain gage is attached to the actuator with an adhesive 25 and, in particular, an epoxy is used. The fiber optic strain gage 20 has an input/output fiber 40 for directing and reflecting light through the device.

Figure 2:
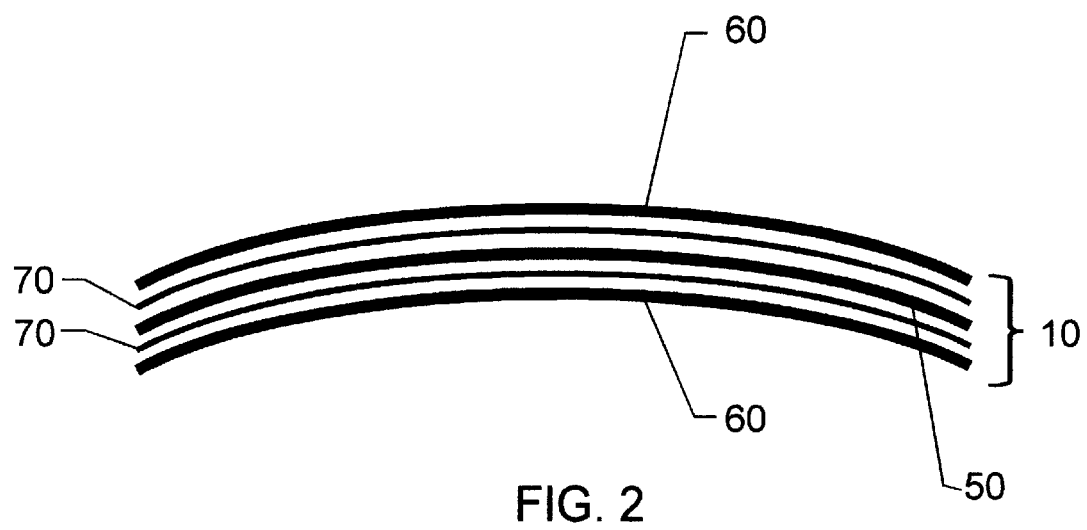
FIG. 2 is a side view of a laminated, pre-stressed, piezoelectric actuator.

The novelty of the invention rests in the laminated, pre-stressed, piezoelectric actuator used in the invention. This actuator, shown in FIG. 2, differs from that used previously. The piezoelectric actuator of the present invention is laminated and pre-stressed. It was discovered that the laminated structure allows the actuator to undergo the application of pressure without fracturing. As a result, it is now possible to collect data during the pressure application step during a prepreg fabrication process. This was not previously accomplished by May et al. In the work of May et al., the ceramic piezoelectric actuators fractured when pressure was applied to the prepreg lay-up. Thus, the arrangement of May et al. was ineffective for applications involving prepreg material or reinforcing fibers that have been impregnated with a resin and must undergo the application of pressure during the fabrication process.

The laminated, pre-stressed, piezoelectric actuators of the present invention are constructed in a method similar to that disclosed in U.S. Pat. No. 5,632,841 to Helibaum et al., which is hereby incorporated by reference. The method of fabrication employs a sheet of lead-zirconate-titanate (PZT) ceramic 50 which is sandwiched between a pre-stressed metal foil sheet 60 and a polyimide film 70. By pre-stressing the metal foil 60 before attaching the PZT 50, a curvature in the plane of the actuator 10 results, allowing greater out-of-plane mechanical displacements than those possible by the PZT actuator alone. In the fabrication process, a laminate is formed by laying-up the metal foil, a layer of polyimide film, the PZT, another layer of polyimide film and another layer of metal foil. It was discovered that this particular fabrication method allowed the actuator to have either a planar or 3-D shape which allows for the application of pressure to the device without damaging it.

Referring back to FIG. 1, the fiber optic strain gage 20 is depicted as a region of the optical fiber 40 and is any fiber optic strain gage known to those skilled in the art. Preferably, the fiber optic strain gage is an extrinsic Fabry-Perot interferometer. These types of strain gages are well-known in the art and are disclosed in U.S. Pat. No. 5,301,001 to Murphy et al., the disclosure of which is hereby incorporated by reference. In a first alternate embodiment, the fiber optic strain gage comprises an optical fiber having a long period grating disposed therein. In yet another embodiment, the fiber optic strain gage comprises an optical fiber having a Bragg (or short period) grating disposed therein.

Figure 3:
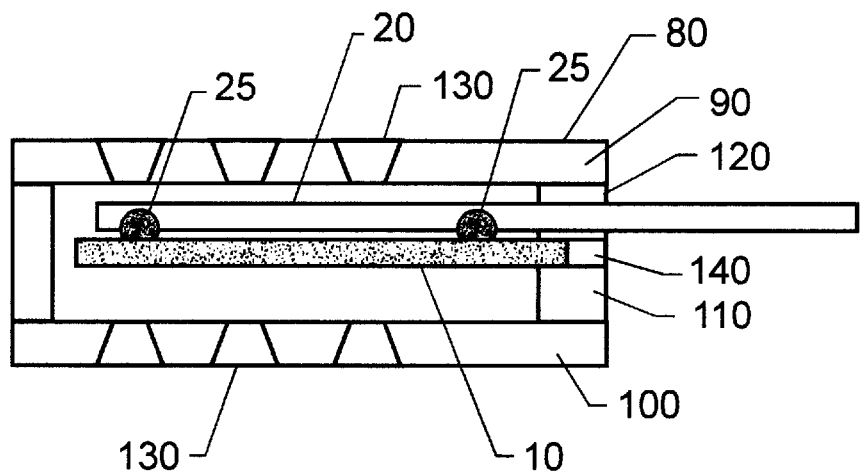
FIG. 3 is a side view of the fiber optic system having a micromachined silicon housing surrounding the fiber optic strain gage and the piezoelectric actuator.

FIG. 3 depicts a further embodiment of the invention wherein the fiber optic strain gage 20 is attached to the piezoelectric actuator 10 with an adhesive 25 and the assembly is housed in a micromachined silicon housing 80. The housing 80 comprises a top plate 90, a lower plate 100 and two identical sides or spacers 110, 120 that clamp onto the piezoelectric actuator 10 to complete the assembly. The top plate 90 and the lower plate 100 have a plurality of ports 130 that permit the resin to flow to the sensor. The spacers 110, 120 have clamps 140 that clamp onto the actuator 10.

Figure 4:
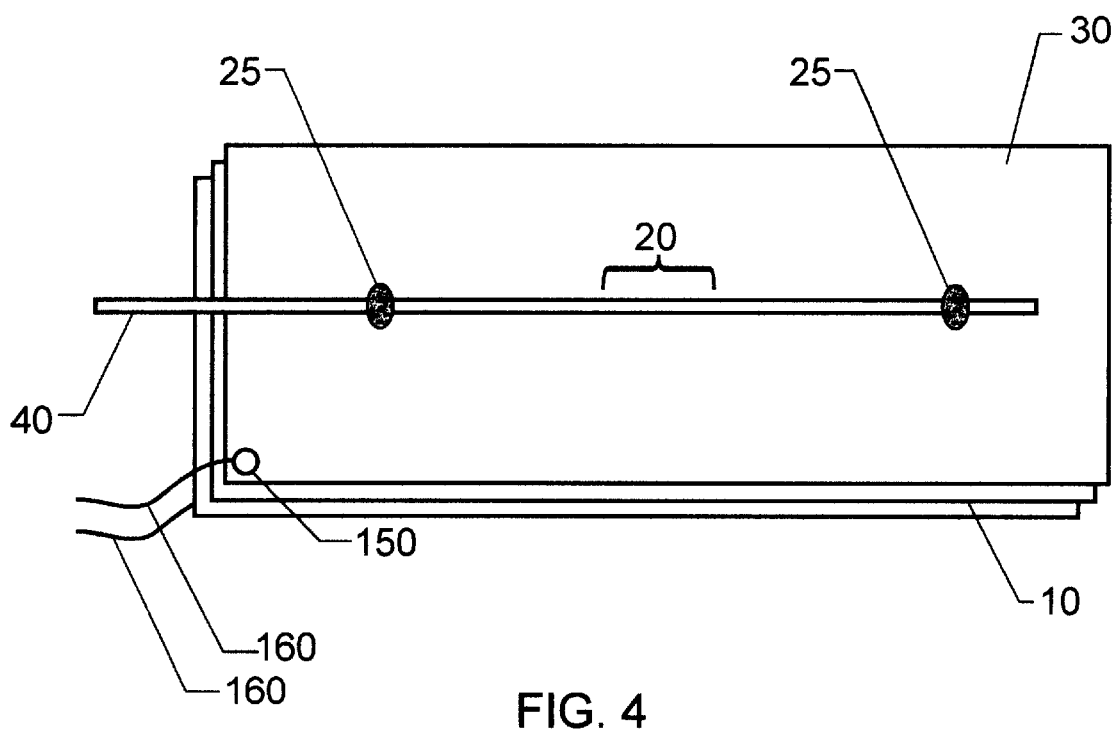
FIG. 4 is a perspective view of the fiber optic system wherein the piezoelectric actuator has an electrode pair and fine gauge wires attached thereto.

FIG. 4 depicts an electrode pair 150 located on the piezoelectric actuator 10 along with the fiber optic strain gage 20 which is attached by an adhesive 25. The piezoelectric actuator 10 has an electrode pair 150 (shown in a preferred location but may be located anywhere on the actuator). Fine gauge wires 160 serve as positive and negative leads and are attached to each of the electrodes 150. By fine it is meant that the gauge ranges from about 22 to about 30 gauge.

Figure 5:
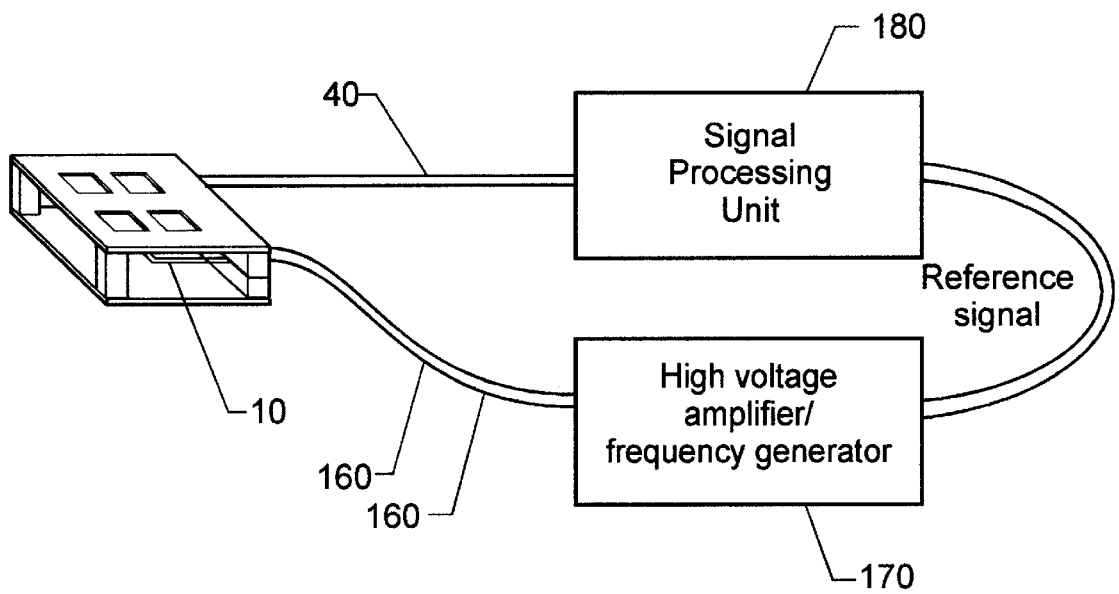
FIG. 5 depicts an arrangement of the fiber optic system including a high voltage amplifier and frequency generator and a signal processing unit.

FIG. 5 depicts a further embodiment where a high voltage amplifier and frequency generator 170 are attached to the fine gauge wires 160 at an end opposite from that attached to the electrodes (not shown). The voltage amplifier and frequency generator 170 causes the actuator 10 to move throughout the test. Also shown is a signal processing unit 180 positioned in an operable relationship to the input/output optical fiber 40 and the fine gauge wires 160. The signal processing unit 180 is comprised of a source/detector, digital signal processed (DSP)-based absolute strain measurement system, a lock-in amplifier, and a computer.

Figure 6A:
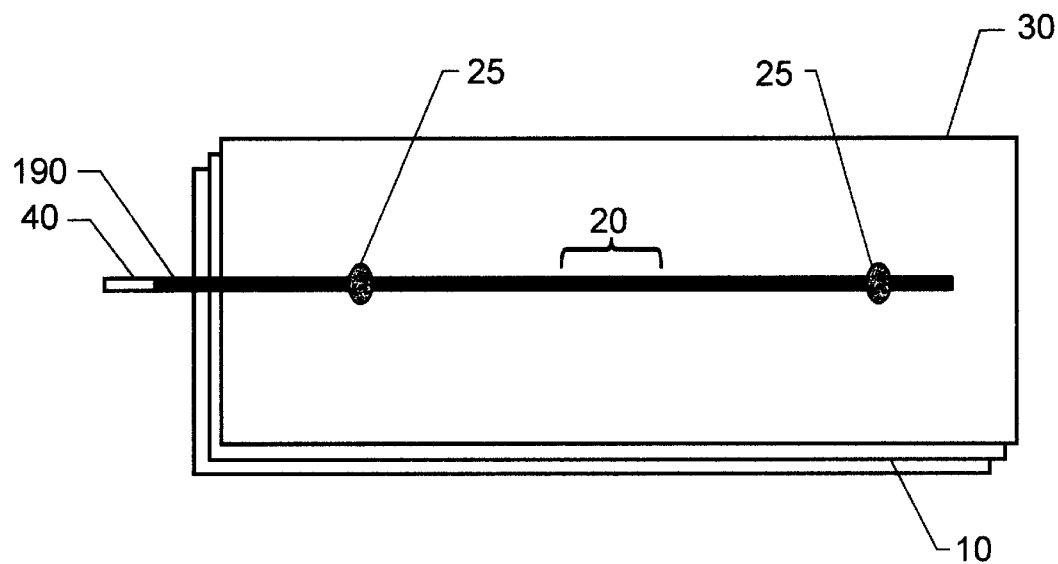
FIG. 6A is a perspective view of the fiber optic system where a metallic coating is disposed on a portion of the input/output fiber and the fiber optic strain gage.
Figure 6B:
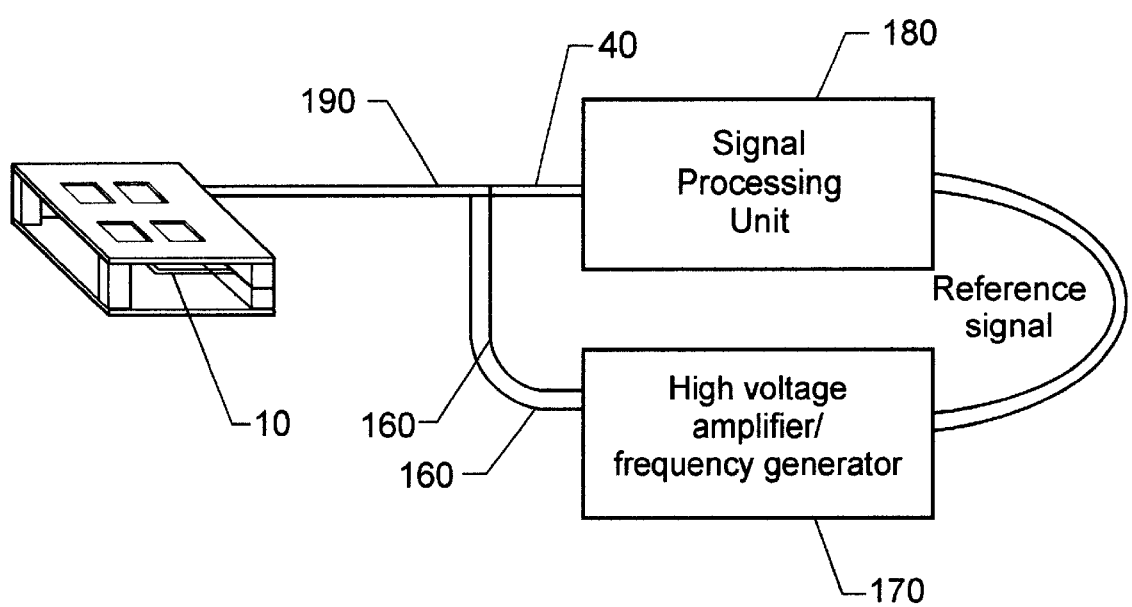
FIG. 6B shows an arrangement of the fiber optic system when a metallic coating is disposed on a portion of the input/output fiber and the fiber optic strain gage.

FIG. 6A shows an alternate embodiment of the invention where at least one metallic coating 190 is disposed on a portion of the input/output fiber 40 and the fiber optic strain gage 20. The metallic coating is a conductor and allows elimination of one or both throughputs by replacing one or both of the electrodes on the piezoelectric actuator. The metallic coating(s) may be applied to the fiber using several different configurations. For example, the metallic coating may be prepared from the same material and applied to the fiber. In this configuration, an insulator or a physical boundary is placed at two separate places to form separate positive and negative contacts. It is also possible to have two separate conductive metal coatings disposed on the input/output fiber. In this configuration, one side of the fiber is coated with one metal coating and the opposing side of the fiber is coated with the second coating. An insulator or physical separation is placed between the two coatings. Regardless of the configuration, the positive lead is connected to coating serving as the positive contact and the negative lead is connected to the other coating or negative contact. One coating layer contacts the top portion of the actuator and the other coating layer contacts the bottom of the actuator. In a preferred embodiment, the fiber optic strain gage 20 comprises an optical fiber having a Bragg grating disposed therein. In FIG. 6B, a further embodiment is shown where a high voltage amplifier and frequency generator 170 are attached to the actuator 10 by fine gauge wires 160 that are attached to the metallic coated portion of the input/output fiber 190. A signal processing unit 180 is positioned in an operable relationship to the input/output fiber 40 and the fine gauge wires 160.

The device of this invention permits dynamic mechanical analysis to be performed on a sample either as it cures or after it has cured. Examples of the samples include but are not limited to polymeric resins or ceramic, titanium or polymeric matrix composites. A fiber optic system comprising a laminated, pre-stressed, piezoelectric actuator having an electrode pair and fine gauge wires attached to the electrodes is provided. A fiber optic strain gage is attached to a surface of the laminated, pre-stressed, piezoelectric actuator. A micromachined silicon housing surrounds the actuator and the fiber optic strain gage. A high voltage amplifier and frequency generator are attached to the fine gauge wires. An input/output fiber is attached to the fiber optic strain gage. Lastly, a signal processing unit for measuring a strain amplitude signal is positioned in an operable relationship to the input/output fiber and the fine gauge wires. The sample is exposed to the fiber optic system. By exposed it is meant that the fiber optic system is either embedded or attached to the test sample. A stress is applied to the sample through the actuator. A change in the strain amplitude signal for the sample is measured using the signal processing unit. In a further embodiment of the invention, the absolute shear modulus and loss tangent are derived from the strain amplitude signal and a change in the exposed sample is determined.

EXAMPLES

Example 1

A pre-stressed, laminated, piezoelectric actuator was constructed following the process described in U.S. Pat. No. 5,632,841 to Hellbaum et al. An extrinsic Fabry-Perot interferometer(EFPI) strain sensor was attached to the upperside or pre-stressed side of the actuator using an epoxy. The sensitivity of the sensor outputs was tested by suspending the sensor in air in a small oven and recording the sensor outputs as the temperature was increased to 180° C. and then cooled to room temperature. A plot of the phase as a function of frequency, an average value of 0.03 degrees (phase) per degree Celsius was estimated for the temperature dependence. The change in the strain amplitude signal was also recorded during this test. The voltage output by the lock-in amplifier was recorded, which is the root-mean-square (RMS) value of the sinusoidally varying signal output by the absolute fiber sensor system, which in turn monitors the fiber optic strain gage. As the temperature increased from 21° C. to 180° C., the output signal also increased from 239 mV to 347mV. When the temperature was reduced from 180° C. to 23.7° C., the strain amplitude decreased from 347 mV to 248 mV. Thus, the temperature-induced change in signal amplitude was found to be $0.4\%°$ $C.^{-1}$.

After characterization of the temperature sensitivity, the sensor was embedded in the midplane of a twelve-ply $(0_2/90_2/0_2)_5$ Gr/Ep lay-up, together with a thermocouple to measure the temperature. The lay-up was placed in a Carver brand hydraulically-operated press and pressure applied to allow for contact between the layers. The temperature was increased to 100° C. and the pressure was maintained for approximately 40 minutes. After this preliminary temperature soak, a nominal pressure sufficient to permit contact of upper and lower plates to the prepreg was applied, and the temperature was ramped to the final temperature of 180° C. The phase output of the lock-in amplifier at 0.5 Hz showed a trend that appears to follow the increase in temperature. By multiplying the change in temperature by the factor (3.5° phase/° C). derived for the temperature-induced phase shift, and subtracting the result from the phase difference, a temperature-corrected phase difference ensues. The corrected phase difference holds approximately constant, until a small decrease is followed by a marked increase 140 minutes after the start of the test. The increase is followed by a small decrease before the phase remained relatively constant for the remainder of the test.

The strain amplitude signal at 0.5 Hz showed a somewhat stronger correlation with the temperature changes. To derive a version of the signal corrected for the temperature variations, the factor (0.4%/° C). derived for the temperature-induced change in signal was multiplied by the change in temperature, and then the result was multiplied by the uncorrected signal. This result, which yielded the variation due to temperature, was subtracted from the uncorrected signal to give the final temperature-corrected signal. It was observed that the trend indicated that the strain amplitude is relatively constant up to 100 minutes into the test, and decreased over the next fifty minutes.

Estimates for the absolute shear modulus and loss tangent were derived from plots of the data. The peak in loss tangent was coincident with a marked rise in the modulus, indicating the occurrence of gelation.

Example 2

Another sensor was constructed in a similar manner to that of Example 1. A 32-ply glass fiber in thermoplastic-toughened epoxy prepreg cross-ply lay-up was constructed with the sensor embedded in it and cured in a vacuum bag in an oven. The sensor survived the lay-up process, including pressing the sensor into the prepreg with a roller, followed by application of 15 psi consolidation pressure through a vacuum bag. A second sensor, employing a standard PZT (ceramic) actuator (similar to that of May et al.), did not survive the lay-up and consolidation process.

The sensors were put in the laminate midplane, surrounded by two plies with 0° orientation (that is, parallel to the optical fiber leads) on both sides. In addition, three thermocouples (top, bottom and midplane) and a dc conductivity sensor were added for logging by the data acquisition system. The dc conductivity sensor measured the ionic conductivity of the resin, which is proportional to the steady shear viscosity. A vacuum bag was added, and vacuum was applied. The lay-up was then cured under vacuum in the oven. The cure cycle for the prepreg used a 6 hour cycle, with a final soak at 176° C. and a couple of intermediate soaks at lower temperatures.

The sensor continued to work throughout the cure cycle. The sensor strain amplitude increased at the beginning of the test, and leveled off at the first temperature soak (200° F.). The strain amplitude dropped by about 90% over a period of approximately 15 minutes, starting at a time coincident with a dramatic rise in viscosity, as measured by the conductivity sensor. This drop in strain amplitude was consistent with the increase in absolute shear modulus expected during gelation.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A fiber optic system comprising:
   a laminated, pre-stressed, piezoelectric actuator; and
   a fiber optic strain gage having an input/output fiber, wherein the fiber optic strain gage is attached to a surface of the laminated, pre-stressed, piezoelectric actuator.

2. A fiber optic system according to claim 1, wherein the fiber optic strain gage is an extrinsic Fabry-Perot interferometer.

3. A fiber optic system according to claim 2, further comprising a micromachined silicon housing surrounding the laminated, pre-stressed piezoelectric actuator and the fiber optic strain gage.

4. A fiber optic system according to claim 3, wherein the laminated, pre-stressed, piezoelectric actuator has an electrode pair and fine gauge wires attached thereto.

5. A fiber optic system according to claim 4, further comprising a high voltage amplifier and frequency generator attached to the fine gauge wires; and a signal processing unit positioned in an operable relationship to the input/output fiber and the fine gauge wires.

6. A fiber optic system according to claim 1, wherein the fiber optic strain gage comprises an optical fiber having a long period grating disposed therein.

7. A fiber optic system according to claim 1, wherein the fiber optic strain gage comprises an optical fiber having a Bragg grating disposed therein.

8. A fiber optic system according to claim 7, further comprising a micromachined silicon housing surrounding the laminated, pre-stressed piezoelectric actuator and the fiber optic strain gage.

9. A fiber optic system according to claim 8, wherein the laminated, pre-stressed, piezoelectric actuator has an electrode pair and fine gauge wires attached thereto.

10. A fiber optic system according to claim 9, further comprising a high voltage amplifier and frequency generator attached to the fine gauge wires; and a signal processing unit positioned in an operable relationship to the input/output fiber and the fine gauge wires.

11. A fiber optic system according to claim 1, further comprising a micromachined silicon housing surrounding the laminated, pre-stressed piezoelectric actuator and the fiber optic strain gage.

12. A fiber optic system according to claim 11, wherein the laminated, pre-stressed, piezoelectric actuator has an electrode pair and fine gauge wires attached thereto.

13. A fiber optic system according to claim 12, further comprising a high voltage amplifier and frequency generator attached to the fine gauge wires; and a signal processing unit positioned in an operable relationship to the input/output fiber and the fine gauge wires.

14. A fiber optic system according to claim 1, further comprising at least one metallic coating disposed on a portion of the input/output fiber and the fiber optic strain gage.

15. A fiber optic system according to claim 14, wherein the fiber optic strain gage comprises an optical fiber having a Bragg grating disposed therein.

16. A fiber optic system according to claim 14, further comprising a high voltage amplifier and frequency generator attached to the actuator; and a signal processing unit positioned in an operable relationship to the input/output fiber and the fine gauge wires.

17. A method for performing dynamic mechanical analysis on a sample, the method comprising the steps of:

a) providing a fiber optic system comprising a laminated, pre-stressed, piezoelectric actuator wherein the actuator has an electrode pair and fine gauge wires attached thereto; a fiber optic strain gage attached to a surface of the laminated, pre-stressed, piezoelectric actuator; a micromachined silicon housing surrounding the laminated, pre-stressed piezoelectric actuator and the fiber optic strain gage; a high voltage amplifier and frequency generator attached to the fine gauge wires; an input/output fiber attached to the fiber optic strain gage; and a signal processing unit for measuring a strain amplitude signal wherein the signal processing unit is positioned in an operable relationship to the input/output fiber and the fine gauge wires;

b) exposing a sample to the fiber optic system;

c) applying a stress to the sample through the actuator; and d) measuring a change in the strain amplitude signal for the sample using the signal processing unit.

18. A method according to claim 17, further comprising the step of deriving absolute shear modulus and loss tangent from the strain amplitude signal and determining a change in the exposed sample.

* * * * *